(12) United States Patent
Tyra et al.

(10) Patent No.: US 7,307,975 B2
(45) Date of Patent: Dec. 11, 2007

(54) POWER MEASUREMENT OF RECEIVED CDMA SIGNALS USING SOFT THRESHOLD PREPROCESSING AFTER CORRELATION

(75) Inventors: Fryderyk Tyra, Huntington Station, NY (US); Louis J. Guccione, East Chester, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 909 days.

(21) Appl. No.: 10/630,616

(22) Filed: Jul. 30, 2003

(65) Prior Publication Data

US 2004/0022228 A1 Feb. 5, 2004

Related U.S. Application Data

(60) Provisional application No. 60/399,767, filed on Jul. 30, 2002.

(51) Int. Cl.
*H04B 7/216* (2006.01)
(52) U.S. Cl. ............... 370/335; 370/342; 375/147; 375/150; 375/345
(58) Field of Classification Search ............... 370/335, 370/342; 375/147, 150, 345
See application file for complete search history.

(56) References Cited

U.S. PATENT DOCUMENTS 4,182,993 A 1/1980 Tyler

| | | |
|---|---|---|
| 6,389,391 B1 | 5/2002 | Terauchi |
| 6,459,402 B1 | 10/2002 | Tsunehara et al. |
| 6,556,871 B2 | 4/2003 | Schmitt et al. |
| 2005/0174968 A1* | 8/2005 | Kitade et al. ............... 370/335 |

OTHER PUBLICATIONS

Donoho, "De-noising by Soft-thresholding", IEEE Transactions on Information Theory, vol. 41, No. 6, May 1995, pp. 613-627.
Donoho et al., "Threshold Selection for Wavelet Shrinkage of Noisy Data", Engineering Advances: New Opportunities for Biomedical Engineers, Proceedings of the 16th Annual International Conference of the IEEE, Nov. 3, 1994, pp. A24-A25.

* cited by examiner

*Primary Examiner*—Chau Nguyen
*Assistant Examiner*—Kenneth R Hartmann
(74) *Attorney, Agent, or Firm*—Volpe and Koenig, P.C.

(57) ABSTRACT

A received power of a code division multiple access (CDMA) signal is determined. Samples of a spectrum associated with the received CDMA signal are taken as received samples, which are then correlated with a code of the CDMA signal. For correlated samples below a first threshold, those correlated samples are processed by being made to be zero. For samples between the first threshold and a second threshold, those correlated samples are processed by rescaling. The correlated samples above the second threshold are passed unchanged. The received power level of the received CDMA signal is determined using the correlated samples after the processing.

10 Claims, 6 Drawing Sheets

POWER MEASUREMENT OF RECEIVED CDMA SIGNALS USING SOFT THRESHOLD PREPROCESSING AFTER CORRELATION

CROSS REFERENCE TO RELATED APPLICATION(S)

This application claims priority from U.S. Provisional Application No. 60/399,767, filed Jul. 30, 2002, which is incorporated by reference as if fully set forth herein.

FIELD OF INVENTION

This invention generally relates to code division multiple access communication systems. In particular, the invention relates to power measurements of received signals in such systems.

BACKGROUND

Power measurements of received signals are important in communication systems. These measurements are used for many purposes, such as determining signal to interference ratios (SIRs), signal to noise ratios (SNRs), power control, and numerous other purposes. Another use of these measurements is for cell search, where a wireless transmit/receive unit (WTRU) selects and synchronizes to a particular cell.

To illustrate using the time division duplex (TDD) mode of the proposed UTRA wideband code division multiple access (W-CDMA) system, in step 1 of cell search, the WTRU measures the power of the primary synchronization signal. In step 2, the WTRU measures the power of secondary synchronization channels and in step 3, the WTRU measures the power of the midamble sequence of the broadcast channel (BCH). Inaccurate power measurements during cell search could lead to the WTRU selecting a non-optimal cell or possibly an unsuccessful cell synchronization. For these purposes, it is important to use accurate measurements of the received signal power.

In code division multiple access (CDMA) communication systems, a particular received signal's power level is typically determined by correlating a received vector with a code of the particular signal. The received vector contains all of the signals transmitted over the particular signal's spectrum along with noise. Since correlating the particular signal's code with noise alone results in some small correlation, it is desirable to remove the noise component from the correlated signal. To remove the noise, correlated samples below a predetermined threshold value are discarded as being noise and are not included in the received signal power determination. Although this approach improves the accuracy of the received signal power determination, it is desirable to increase the accuracy further.

SUMMARY

A received power of a CDMA signal is determined. Samples of a spectrum associated with the received CDMA signal are taken as received samples, which are then correlated with a code of the CDMA signal. For correlated samples below a first threshold, those correlated samples are processed by being made to be zero. For samples between the first threshold and a second threshold, those correlated samples are processed by rescaling. The correlated samples above the second threshold are passed unchanged. The received power level of the received CDMA signal is determined using the correlated samples after the processing.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, a WTRU includes, but is not limited to, a user equipment, a mobile station, a fixed or mobile subscriber unit, a pager, or any other type of device capable of operating in a wireless environment. When referred to hereafter, a base station includes, but is not limited to, a base station, a Node-B, a site controller, an access point, or other interfacing device in a wireless environment.

Figure 1:
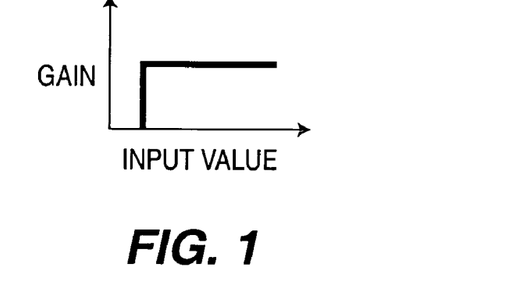
FIG. 1 is a graph of a hard threshold transfer function.
Figure 2:
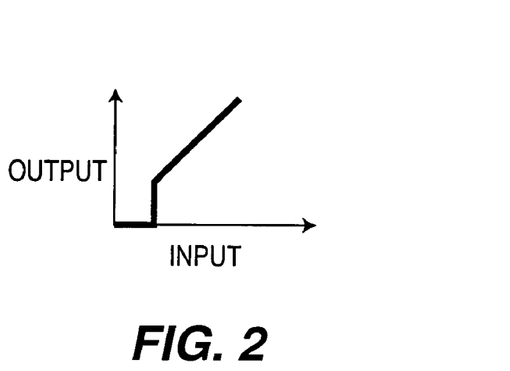
FIG. 2 is a graph of a correlator output after a hard threshold is used.

In a CDMA system, there are window size (WS) lags output from the correlators, and under existing methods these outputs are evaluated against a hard threshold before summing them into a total power measurement. The hard threshold may be too coarse to make a good, stable power measurement. FIG. 1 is a graph of a transfer function for a hard threshold. As shown in FIG. 1, the gain suddenly spikes when the input value exceeds the hard threshold. FIG. 2 shows a graph of a correlator output where a hard threshold-based algorithm is applied. As shown in FIG. 2, the graph has unity gain (slope=1) for most of the curve; however, because of the hard threshold, the output will be zero at low signal input levels.

The reason for considering a soft threshold is that there are difficulties in establishing the correct hard threshold for the current algorithms, as illustrated by the abrupt changes in the graphs in FIGS. 1 and 2. Because of the unpredictable midamble cross-correlations that can occur between cells, sometimes a sidelobe may be pushed under the threshold and may not be considered in the power summation. The disposition of the sidelobe depends on whether the cross-correlation terms add to the real power or subtract from the real power at any given lag. The cross-correlations are vectors, so they may add or subtract depending on the phase relationship between the desired signal and the cross-correlation terms. This makes the power measurement highly variable, depending on cross-correlation properties of the specific set of midambles in use at the time.

The effect of multipath also introduces some significant variations, which may push sidelobes over or under the hard threshold. Another source of variability is the sampling instant. Even though the samples are being taken at 2×, the offset relative to the real peak of each chip is unknown. Therefore, some of the samples may be included in the summation if they are above the hard threshold, and other samples may be excluded if they fall below the hard threshold. This determination depends on the exact relationship between the chip sampling clock and the transmitter chip clock. With a soft threshold, the effect of various cross-correlations and multipath will be less dramatic, yet the desired effect of filtering out the noise floor would still be achieved.

Figure 3A:
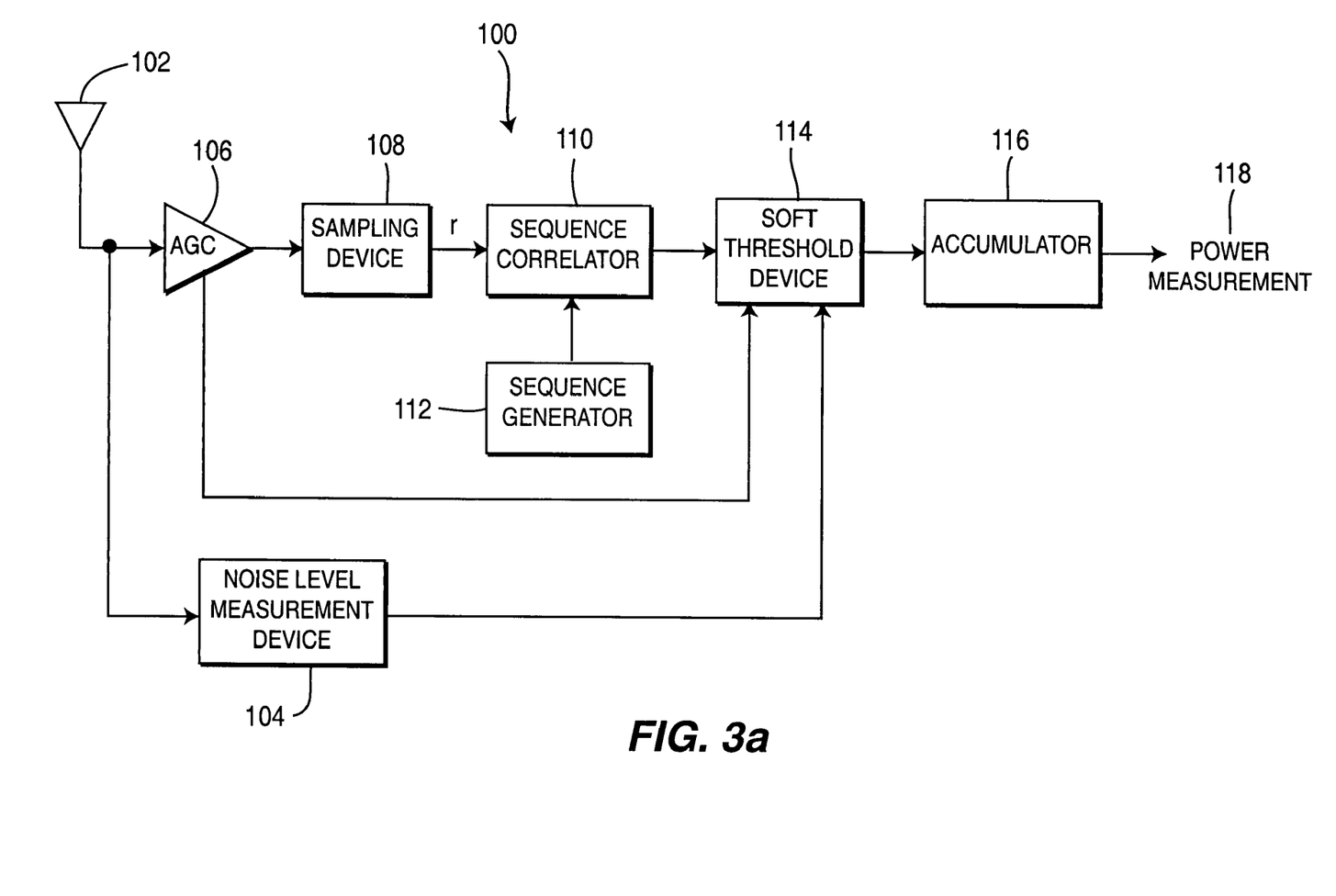
FIG. 3a is a block diagram of a receiver containing a power measurement apparatus constructed in accordance with the present invention.

FIG. 3a shows a receiver 100 including a power measurement apparatus constructed in accordance with the present invention. An antenna 102 receives a transmitted signal, which is passed to a noise level measuring device 104 and an automatic gain controller (AGC) 106. The AGC 106 produces a gain control signal that is sent to a sampling device 108 and a soft threshold device 114. The sampling device 108 produces a received vector $\underline{r}$, which is passed to a sequence correlator 110 that correlates the vector $\underline{r}$ with a sequence of the signal to be measured. A sequence generator 112 supplies the reference sequence against which the received signal is correlated.

The soft threshold device 114 receives the correlated signal from the correlator 110, the gain control value from the AGC 106, and a noise level measurement from the noise level measuring device 104 as inputs. The soft threshold device 114 derives a soft threshold value based upon the measured noise level and the gain control value. The soft threshold device 114 then applies the soft threshold value to the correlated signal, discarding any correlated signals that are below the soft threshold value. An accumulator 116 accumulates the correlated signals that exceed the soft threshold value over a desired period and produces a power measurement 118 of the desired signal.

Figure 3B:
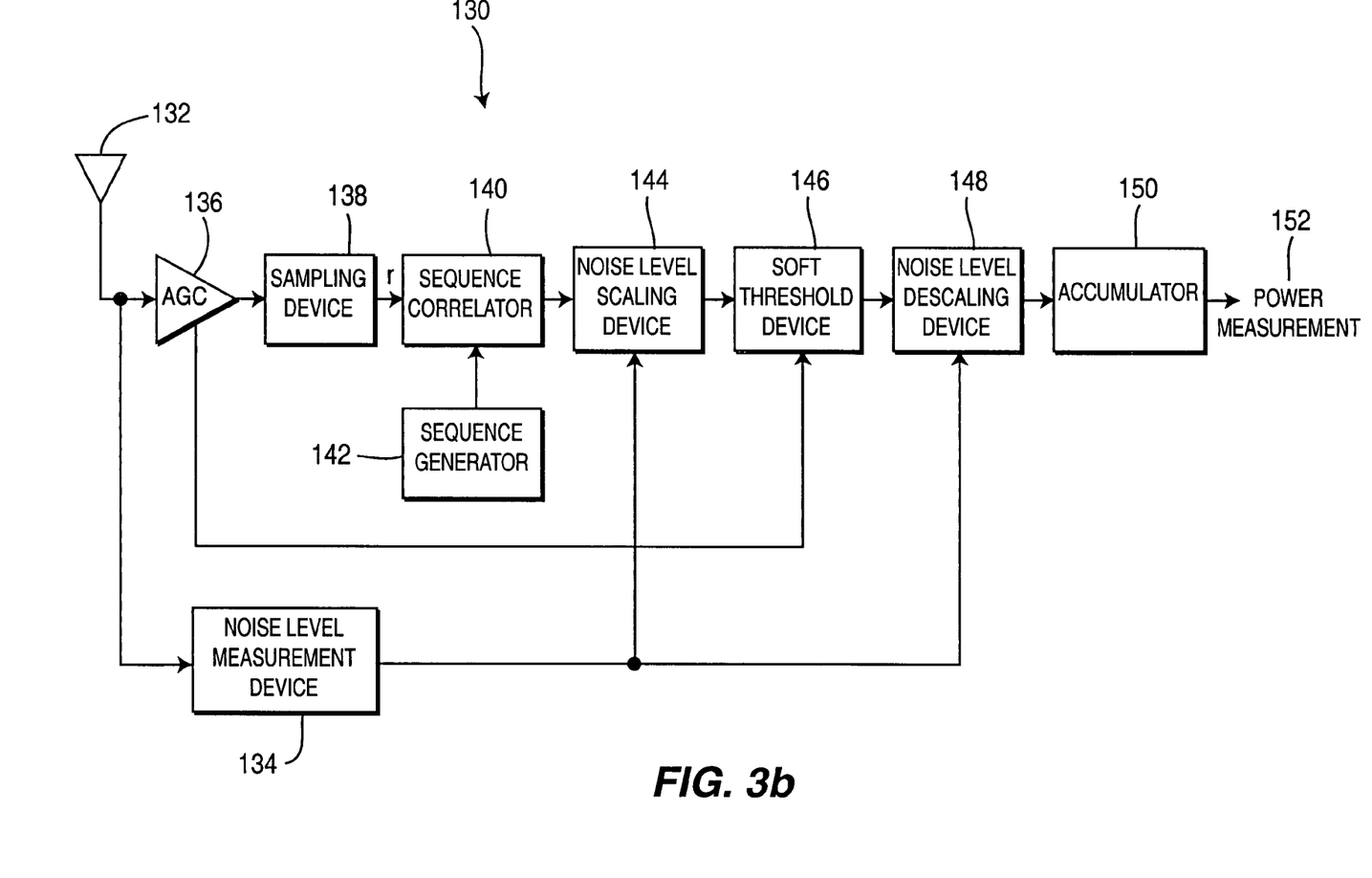
FIG. 3b is a block diagram of an alternate embodiment of a receiver containing a power measurement apparatus constructed in accordance with the present invention.

FIG. 3b shows an alternate embodiment of a receiver 130 including a power measurement apparatus constructed in accordance with the present invention. An antenna 132 receives a transmitted signal, which is passed to a noise level measuring device 134 and an automatic gain controller (AGC) 136. The AGC 136 produces a gain control signal that is sent to a sampling device 138 and a soft threshold device 146. The sampling device 138 produces a received vector $\underline{r}$, which is passed to a sequence correlator 140 that correlates the vector $\underline{r}$ with a sequence of the signal to be measured. A sequence generator 142 supplies the reference sequence against which the received signal is correlated. A noise level scaling device 144 receives the correlated signal and a noise level measurement as inputs and outputs a scaled correlated signal.

The soft threshold device 146 receives the scaled correlated signal from the noise level scaling device 144 and the gain control value from the AGC 136 as inputs. The soft threshold device 146 derives a soft threshold value based upon the gain control value. The soft threshold device 146 then applies the soft threshold value to the scaled correlated signal, discarding any correlated signals that are below the soft threshold value. A noise level descaling device 148 receives the correlated signals that exceed the soft threshold value and the noise level measurements as inputs and outputs a descaled result using the measured noise level. An accumulator 150 accumulates the descaled values over a desired period and produces a power measurement 152 of the desired signal.

Figure 4A:
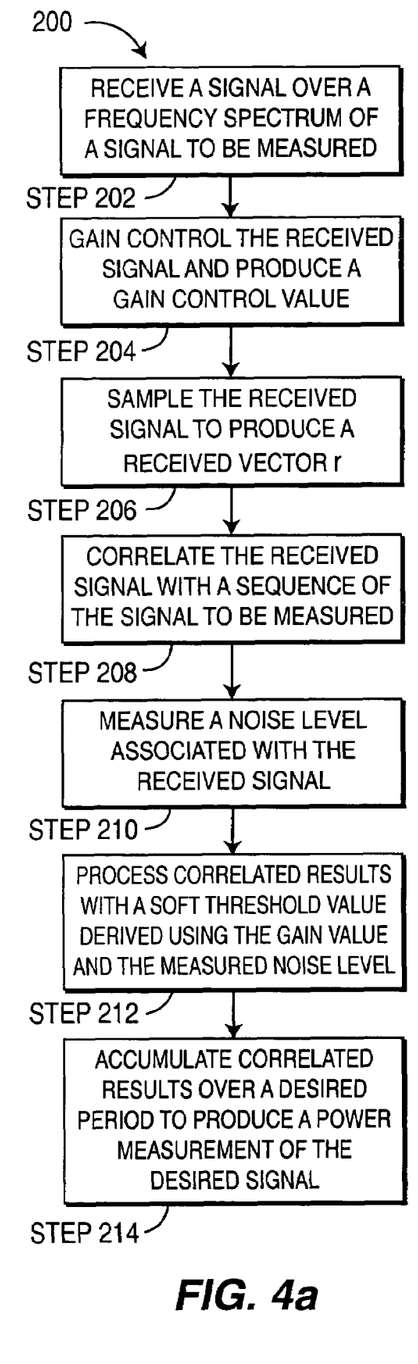
FIG. 4a is a flowchart of a method of obtaining a power measurement in accordance with the present invention.

FIG. 4a is a flowchart of a method 200 for obtaining a power measurement according to the present invention. The method 200 begins by receiving a signal over a frequency spectrum of a signal to be measured (step 202). A gain control is applied to the received signal to produce a gain control value (step 204). The received signal is sampled, producing a received vector $\underline{r}$ (step 206). The received signal is then correlated with a sequence of the signal to be measured (step 208). A noise level of the received signal is measured (step 210). The correlated results are then processed with a soft threshold value which is derived using the measured noise level and the gain value (step 212). The processed, correlated results are accumulated over a desired time period to produce a power measurement of the desired signal (step 214).

Figure 4B:
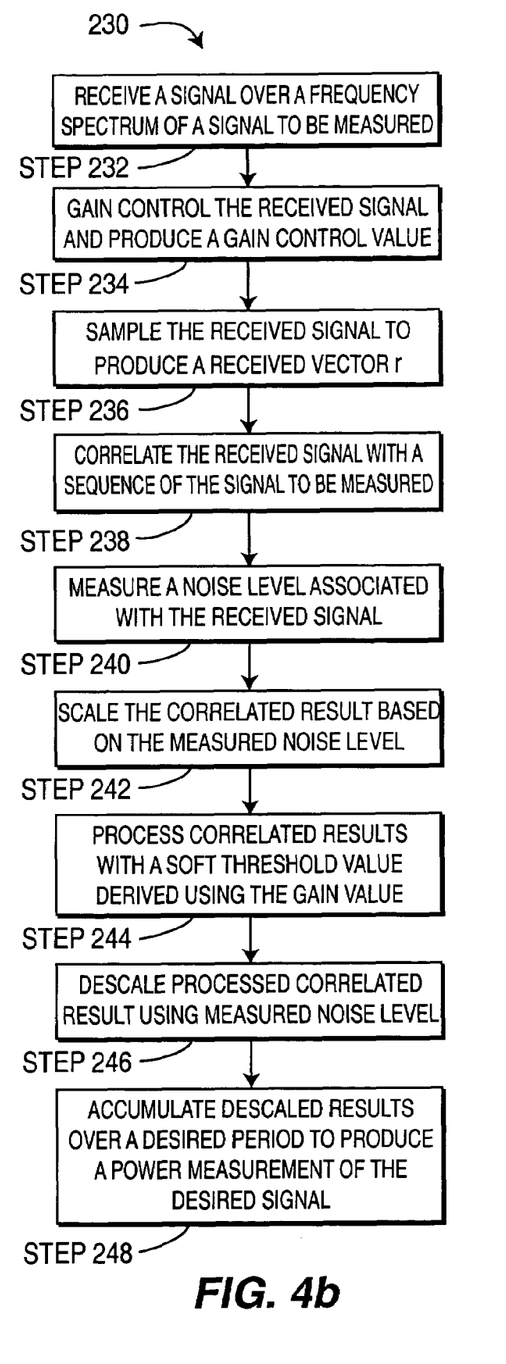
FIG. 4b is a flowchart of an alternate method of obtaining a power measurement in accordance with the present invention.

FIG. 4b is a flowchart of an alternate method 230 for obtaining a power measurement according to the present invention. The method 230 begins by receiving a signal over a frequency spectrum of a signal to be measured (step 232). A gain control is applied to the received signal to produce a gain control value (step 234). The received signal is sampled, producing a received vector $\underline{r}$ (step 236). The received signal is then correlated with a sequence of the signal to be measured (step 238). A noise level of the received signal is measured (step 240).

The correlated result is then scaled based upon the measured noise level (step 242). The scaled results are then processed with a soft threshold value which is derived using the gain value (step 244). The processed, correlated results are descaled using the measured noise level (step 246). The descaled results are accumulated over a desired time period to produce a power measurement of the desired signal (step 248).

Figure 5:
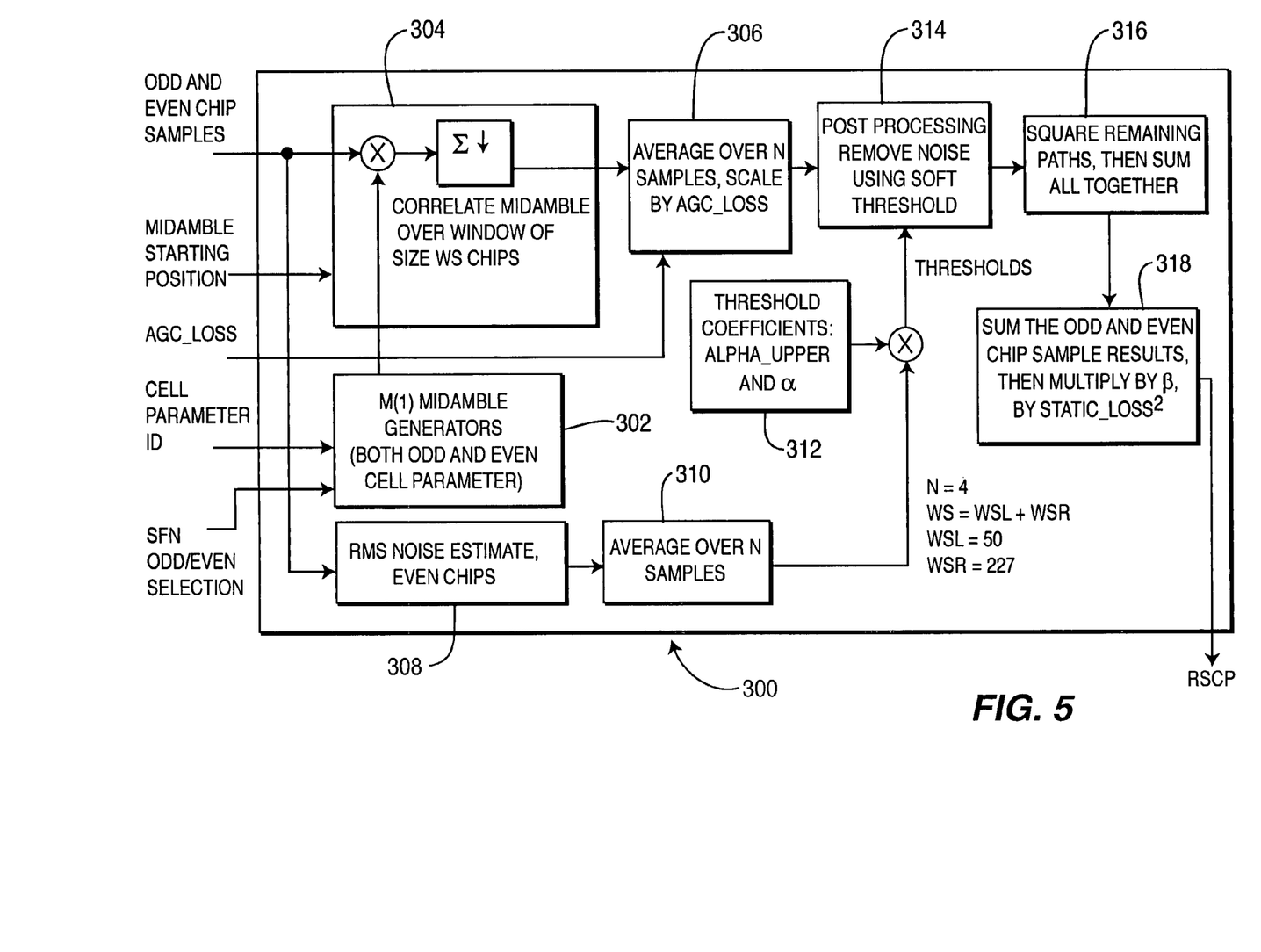
FIG. 5 is a block diagram of the application of soft thresholds used in calculating the RSCP of the PCCPCH at a WTRU in accordance with the present invention.

The remainder of the discussion relates to a specific example of an embodiment of the present invention described in connection with cell search step 3. Referring now to FIG. 5, a method 300 for obtaining a power measurement in accordance with the present invention generally operates as follows; details regarding each step of the method 300 will be discussed below. A midamble is captured (block 302) and is correlated over a sliding window of a predetermined size (block 304). The correlations are averaged over N samples, and are scaled by the AGC loss (block 306). The noise in the system is estimated by a root mean squared function by using the even-numbered chips (block 308), and is averaged over N samples (block 310). Upper and lower soft thresholds are determined (block 312) and are used to remove the RMS-averaged noise from the correlated samples (block 314). The noise-free samples are squared and summed (block 316). Lastly, the odd and even chip sample results are added and are multiplied by several scaling factors to determine the RSCP value (block 318).

The method 300 is preferably used to measure the power of received signals from CDMA base stations, although it can be used for measuring the power level of other signals. For example, in a UMTS system application, this measurement is called PCCPCH Received Signal Code Power (RSCP), which is the received power on the primary common control physical channel (PCCPCH) of its own cell or of a neighboring cell. The reference point for the RSCP is the antenna connector at the wireless transmit/receive unit (WTRU).

The signal used for input to the method 300 is preferably the received signal on the PCCPCH from the RF receiver after conversion to baseband. The preferred control information is the slot number of the PCCPCH, the starting position of the midamble in the slot, the cell parameter ID, and the serial frame number (SFN) odd/even selection. Preferably, the received signal in the vicinity of the PCCPCH midamble is captured every five frames. These captured signals are processed over a 20 frame period. A new PCCPCH RSCP value is determined at the end of this 20 frame period.

For the target cell, PCCPCH RSCP can be measured by cross-correlating the samples of the received beacon midamble against a stored replica of the midamble, $m^{(1)}$, of the PCCPCH of the target cell (block 304). The PCCPCH power and the beacon are related.

The measurement of neighbor cells can only be performed after an initial cell search completes synchronization and reads the neighbor list from the BCH, and a periodic cell search confirms and locates the neighbors. The RSCP measurements can then be made for up to six selected neighbors within the 200 msec measurement period (the 200 msec requirement applies only to the CELL_DCH and CELL_FACH states).

The following procedures based on cell search step 3 are used to meet the measurement requirements. The uncertainty in the received signal time, caused by multipath delay spread and Node-B sync errors, requires the use of RSCP measurement within a window. It is assumed that periodic cell search has been previously used to locate the cell to be measured, and therefore uncertainty due to propagation delay is not a factor. Considering the worst-case Node-B sync errors and adding a 57-chip multipath spread window, the RSCP measurement can be reduced to searching over 227 chips, covering 50 chips ahead and 177 chips behind the location of its own cell (this includes 57 extra chips to support transmit diversity operation: 120+57=177). This window captures most of the significant multipath components from antenna 1 and antenna 2 (in transmit diversity). Thus 2×(512+50+177)=1478 I and 1478 Q samples that are collected during the beacon period, where the midamble size is 512 chips.

Cell search step 3 accomplishes 170 512-chip correlations for four scrambling codes within half of a frame before collecting the next samples. The values from each slot are integrated over four frames before final detection. A total of 4×340=1360 memory locations are needed. Neighbor cell search requires that 32 cells (64 codes with odd/even cell parameter ID pairs) be searched over 227 chips (including the extra chips for transmit diversity), or 454 samples. The search is repeated four times with 200 msec between each search.

RSCP measurements require seven codes, rather than four. Correlations are performed using six neighboring cell codes and the serving cell code, with four samples being taken every 200 msec. The correlators use coherent summation over all 512 chips. The total time for neighbor cell search and RSCP measurements is 16 frames and four frames, respectively, for a total of 20 frames, which satisfies the 200 msec requirement.

A further refinement is L1 filtering, which is used to achieve time diversity against fading and was shown to be effective in smoothing out fading, based on simulation. The L1 filtering is accomplished as follows. Once every five frames over a period of 20 frames (200 msec), a midamble burst is stored and correlated. These four correlation results in the 200 msec period are then averaged together before postprocessing is applied. RSCP measurement results for all six neighbors and the serving cell are reported to higher layers every 50 msec. A sliding window, or moving average method, is used with a sliding window size of 200 msec which corresponds to the measurement period.

After completing the correlation/search, a noise estimate is used to establish a threshold which is then used to separate the noise from the desired samples. The noise is averaged over 20 frames in the 200 msec measurement period. Only four of the 20 frames are used to calculate the noise estimate, i.e., every fifth frame is used. Only even chip samples are used in the noise estimate (blocks 308, 310). It is noted that the noise statistics for the odd and even samples are the same.

It is noted that odd/even SFN midamble balancing is achieved inherently through the use of an odd-length frame spacing of 50 msec, along with using four samples in the moving average. Cross-correlation error terms that occur in even SFN frames have a different value than those occurring in odd SFN frames, and this method averages out the error between the odd and even SFN frames.

The preferred midamble correlation (block 304) is performed over the input window size WS as follows:

$$|y(i)| = \left| \sum_{j=0}^{511} [x(i+j) \cdot m^{(1)*}(j)] \right| \qquad \text{Equation (1)}$$

where $|y(i)|$ is the magnitude of the midamble correlation to be stored (an array of length WS), where the multiplication is complex, $m^{(1)*}$ is the complex conjugate of the cell parameter midamble $m^{(1)}$, and where $0 \leq i < WS$. WS is nominally 227 chips. The data variable x ranges from x(0), which is located at the midamble starting point minus WSL chips, to x(511+WS). Hence, a total of 227 (=WSL+WSR=WS) correlations are performed. To support transmit diversity, the total window size was extended from 170 chips to 227 chips, rather than correlating against $m^{(2)}$; this can be done because most of the energy from antenna 2 will appear 57 chips later in the $m^{(1)}$ correlator.

The absolute value in Equation (1) is computed (approximated) as follows:

$$|x| = \max(|I|,|Q|) + \min(|I|,|Q|)/2 \qquad \text{Equation (2)}$$

where I and Q are, respectively, the in-phase and quadrature components. This method of approximation is referred to as L+S/2 approximation. An error mean, $\mu$, of 0.7 dB is associated with this absolute value approximation and must be subtracted out, as discussed below. Since this error is constant, it may be accounted for at the end of all the computations along with the other constant correction (i.e., the Static_loss correction).

The preferred moving average calculation (block 306) is performed as follows. The z value is the sum of the correlation energy of the four moving average samples (the averaging is done before the threshold is applied), as shown in the following equation:

$$z(i) = \frac{1}{4} \sum_{n=1}^{4} \text{AGC\_loss}_n \cdot |y(i)| \qquad \text{Equation (3)}$$

where $0 \leq i < WS$, AGC_loss is the antilog of the logarithmic value of the AGC gain setting which is updated on a frame rate basis, and n is the frame number. The resulting z value is an array of WS values, which is then passed on to the postprocessing function to remove the noise through the use of thresholding (block 314).

The preferred noise calculation (blocks 308, 310) is a straight four frame moving average of the magnitudes of the data points over the range, which starts at WSL chips before the midamble starting point and ends at 512+WSR chips to the right of the midamble starting point. The equation is written as follows:

$$\text{noise} = \frac{1}{4 \cdot N} \cdot \sum_{n=1}^{4} \left( \text{AGC\_loss} \cdot \sum_{i=0}^{N} |x(i)| \right) \quad \text{Equation (4)}$$

where n is the frame number and N=512+WS.

The preferred threshold calculation and noise removal procedure is as follows. Two threshold values, an upper and a lower, are calculated by multiplying the noise value by two predetermined constants, ALPHA_UPPER and α, respectively (block 312). In a preferred embodiment, ALPHA_UPPER=200 and α=78. The two threshold computations are written as follows:

Threshold_upper=noise*ALPHA_UPPER     Equation (5)

Threshold_lower=noise*α     Equation (6)

To remove the noise, the magnitudes of the correlated values are set to zero if they are less than Threshold_lower, they are left unchanged if they exceed Threshold_upper, and are scaled as shown below if they fall somewhere in between (block 314). This logic is shown as follows:

if $z(i)$<Threshold_lower then $z_{new}(i)$=0, else if $z(i) \geq$ Threshold_upper, then $z_{new}(i)$=$z(i)$, else $z_{new}(i)$=($z(i)$−Threshold_lower)*slope*$z(i)$, where slope=1.0/(Threshold_upper−Threshold_lower), and $0 \leq i < WS$.

The RSCP_sum value is the sum of the correlation energy after the noise was removed by soft-thresholding. The remaining paths are squared and summed together (block 316), as follows:

$$\text{RSCP\_sum} = \sum_{i=0}^{WS-1} |z(i)|^2 \quad \text{Equation (7)}$$

The arithmetic processing described above is generic with respect to oversampling. All equations process both even and odd chip sample components, separately, up until this part of the algorithm. Given that oversampling is part of the standard implementation design, even and odd chip sample data streams will always be present. The neighbor search algorithm provides the RSCP algorithm with the correct odd or even SFN parameter for each of the six neighbors to be measured, so odd/even SFN does not have to be determined within the RSCP algorithm.

The values $\text{RSCP\_sum}_{even}$ and $\text{RSCP\_sum}_{odd}$ are added, i.e., the odd and even accumulators are added together. Therefore, the final RSCP value to be reported is RSCP_Meas (block 318), and is given as follows:

RSCP_Meas=β·(RSCP_sum$_{even}$+
RSCP_sum$_{odd}$)·Static_loss²,     Eq. (8)

where β is a scale factor based on simulations of best and worst case chip timing offsets. In a preferred embodiment, β=0.573.

Figure 6A:
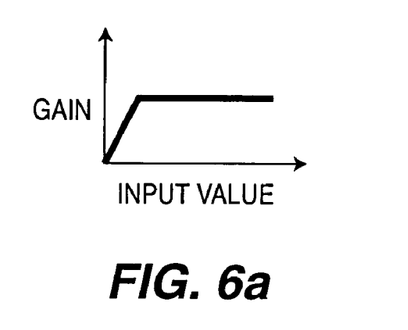
FIGS. 6a and 6b are graphs of soft threshold transfer functions in accordance with the present invention.
Figure 6B:
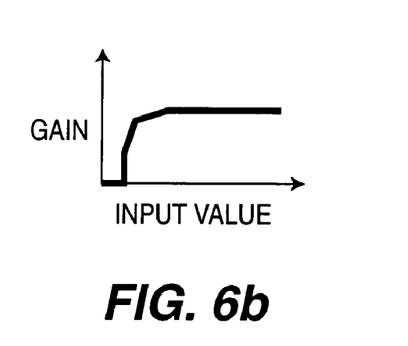

A soft threshold is used for determining how the correlator output components should be summed into the total power measurement. FIGS. 6a and 6b show how a soft threshold can be applied to the correlator outputs. The transition region is linear in FIG. 6a; i.e., it has a sloped line. An exponential curve may have better performance at the expense of potentially higher complexity, as shown in FIG. 6b.

In an alternate implementation, a lookup table may be used to create a quantized version of any transfer function desired and basically operates as follows. A gain value is looked up in the table based on the input signal value. The input signal is multiplied by that value to apply the soft threshold, then these values are summed together to determine the total power.

Figure 7A:
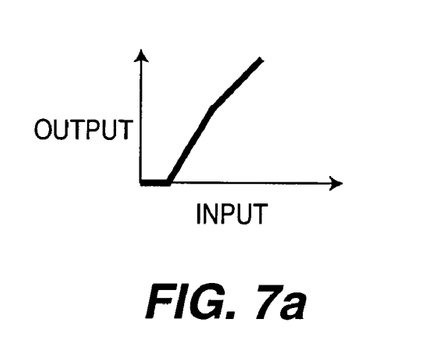
FIGS. 7a and 7b are graphs of correlator outputs after soft thresholds are used.
Figure 7B:
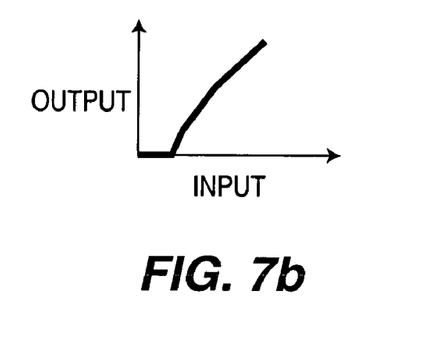

Another way to look at the soft threshold function is to treat it as a nonlinear gain/processing device with the following transfer functions. The input to the device is the magnitude of the correlator outputs at each lag. The output has the threshold applied to it. FIGS. 7a and 7b are graphs representing the output of correlators applying soft thresholds, with a two segment curve example and a three segment curve example, respectively. It is noted that the knees of these curves are based on the measured noise value. This is still a noise-based threshold, but the shape of the thresholding function is softened; therefore, the knee locations are not static. It may be difficult to physically realize a block with a curve that moves around dynamically, so one way to implement the soft threshold is to take the input value and prescale it by the reciprocal of the mean noise level. Then the curve shape would be static and would be independent of the mean noise level. However, the output side would require an additional multiplication by the mean noise level to restore the original signal level.

Figure 8:
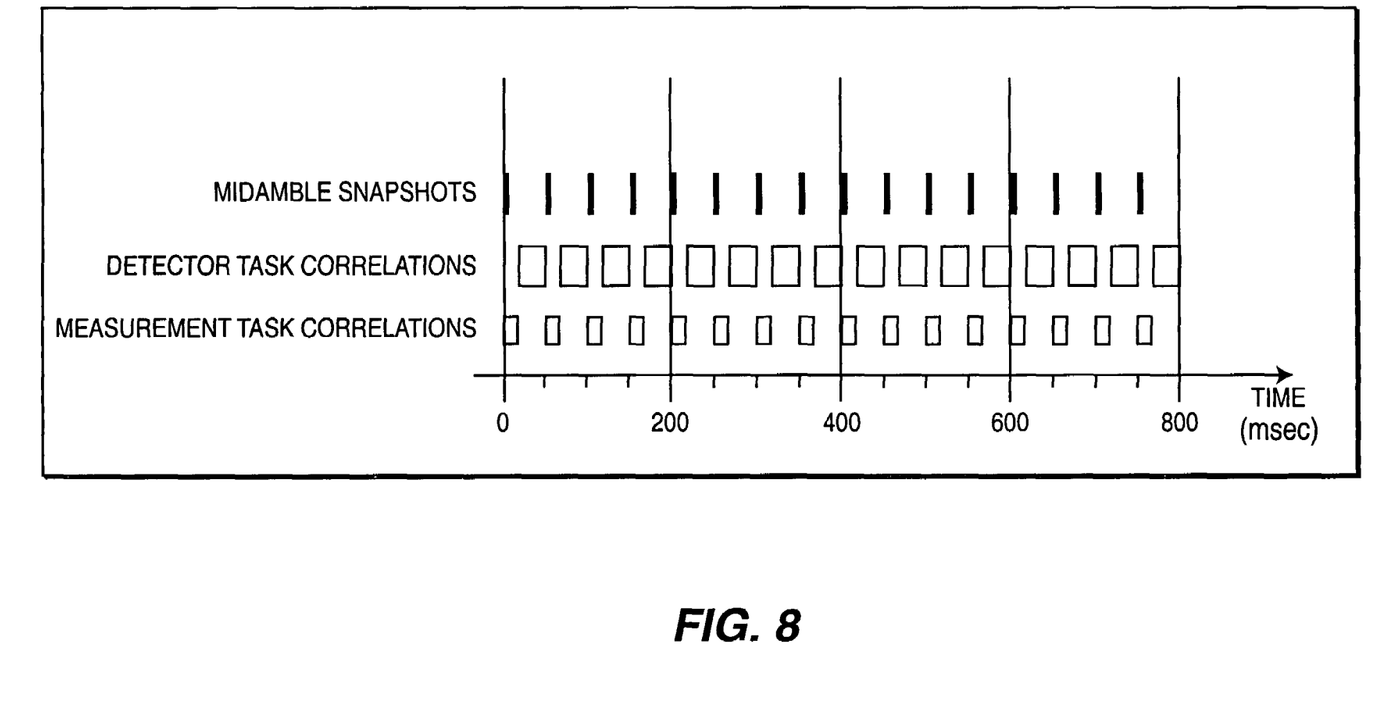
FIG. 8 is a timing diagram of PCCPCH RSCP measurements taken in accordance with the present invention.

To accomplish the CELL_DCH state timing requirements in the 3GPP standards, i.e., with respect to the time allowed to search through 32 neighbors (800 msec), and the time allowed to make six neighbor cell RSCP measurements (200 msec), under the constraint of a limited number of correlators available from cell search hardware, the timing of operations as shown in FIG. 8 is preferred. The timing is split into two tasks: a detection task and a measurement task. The detection task measures the RSCP of up to 32 neighbors in the neighbor list over a measurement period of 800 msec and subsequently determines the six strongest neighbors. The measurement task measures the RSCP of these six strongest neighbors and the active serving cell, over a measurement period of 200 msec.

The detection task takes a snapshot of the received signal, specifically the PCCPCH midamble over the window size of 227 chips, once every 200 msec. During that same 200 msec period, the measurement task takes four snapshots spaced five frames apart. During the first frame of a 200 msec period, the measurement task uses all of the correlators. Then during the subsequent four frames, the detection task uses the correlators. This alternating use of the correlators is repeated several times in the 200 msec period. At the end of four of these 200 msec periods, the detection task takes the four results (from the four snapshots in previous 800 msec), averages them, and then selects the six strongest neighbors. A sliding window (i.e., moving average) method is used, so that the set of six strongest neighbors is updated by the detection task every 200 msec.

The measurement task then makes measurements on these six strongest neighbors and reports their power level periodically, every 50 msec. It reports the power of the same six neighbors for four consecutive 50 msec measurement periods, and then it continues to report the power of the newest set of six strongest neighbors, after the set of six strongest neighbors is updated by the detection task. This process repeats indefinitely while in the CELL_DCH state.

The actual implementation of the detection task will use the snapshots that are used by the measurement task, which are taken once every 50 msec, instead of every 200 msec. This reduces the memory requirements because the snapshots that would have been taken by the detection task do not need to be retained for 200 msec. There is a minor difference in operation when using this alternative, namely that the correlations in the detection task for all 32 cells are not performed on the same snapshot. However, due to the long time window over which the measurements are averaged, no difference in performance is expected.

While this invention has been particularly shown and described with reference to preferred embodiments, it will be understood by those skilled in the art that various changes in form and details may be made without departing from the scope of the invention as described herein above.

What is claimed is:

1. A method for determining the power of a received code division multiple access (CDMA) signal, comprising the steps of:
    capturing a midamble;
    correlating the midamble with the received signal over a sliding window;
    averaging and scaling the correlations;
    approximating and averaging the noise level in the system;
    calculating an upper threshold and a lower threshold;
    applying the upper threshold and the lower threshold to the correlated samples to remove the noise from the correlated samples; and
    processing the noise-free samples to determine the received signal code power.

2. The method according to claim 1, wherein the capturing step is performed every five frames.

3. The method according to claim 1, wherein the correlating step is performed over a sliding window of 227 chips.

4. The method according to claim 1, wherein the applying step includes
    zeroing out the correlated sample if the correlated sample is below the low threshold;
    passing through the correlated sample if the correlated sample is above the upper threshold; and
    scaling the correlated sample if the correlated sample is between the lower threshold and the upper threshold.

5. The method according to claim 1, wherein the processing step includes the steps of:
    squaring and summing the noise-free samples; and
    scaling the squared and summed values to obtain the received signal code power value.

6. An apparatus for measuring the power of a received code division multiple access (CDMA) signal, comprising:
    a noise level measuring device for measuring the noise level of the received signal;
    an automatic gain control device for determining the gain of the received signal;
    a sampling device for sampling the received signal;
    a sequence generator supplying a reference sequence;
    a sequence correlator for correlating the sampled signals with the reference sequence, producing correlated signals;
    a soft threshold device which applies a soft threshold to the correlated signals; and
    an accumulator for accumulating the correlated signals after being processed by said soft threshold device, said accumulator producing the power measurement of the received signal.

7. The apparatus according to claim 6, wherein said soft threshold is derived from the gain of the received signal and the noise level of the received signal.

8. The apparatus according to claim 6, further comprising
    a noise level scaling device, for scaling the noise level measurement obtained from said noise level measurement device; and
    a noise level descaling device connected between said soft threshold device and said accumulator, said noise level descaling device descaling the processed correlated signals using the noise level measurement.

9. A method for measuring the power of a received code division multiple access (CDMA) signal, comprising the steps of:
    applying a gain control to the received signal to produce a gain control value;
    sampling the received signal;
    correlating the sampled signals with a sequence of the received signal;
    measuring a noise level of the sampled signals;
    generating a soft threshold value using the gain control value and the measured noise level;
    processing the correlated signals with the soft threshold value; and
    accumulating the processed signals over a desired time period, whereby the power measurement of the received signal is obtained.

10. A method for measuring the power of a received code division multiple access (CDMA) signal, comprising the steps of:
    applying a gain control to the received signal to produce a gain control value;
    sampling the received signal;
    correlating the sampled signals with a sequence of the received signal;
    measuring a noise level of the sampled signals;
    scaling the correlated signals based on the measured noise level;
    generating a soft threshold value using the gain control value;
    processing the correlated signals with the soft threshold value;
    descaling the processed signals using the measured noise level; and
    accumulating the processed signals over a desired time period, whereby the power measurement of the received signal is obtained.

* * * * *

UNITED STATES PATENT AND TRADEMARK OFFICE
CERTIFICATE OF CORRECTION

PATENT NO. : 7,307,975 B2  Page 1 of 1
APPLICATION NO. : 10/630616
DATED : December 11, 2007
INVENTOR(S) : Tyra et al.

It is certified that error appears in the above-identified patent and that said Letters Patent is hereby corrected as shown below:

IN THE DRAWINGS

At FIG. 3a, between items "108 & 110", delete "r" and insert therefor --r--.

At FIG. 3b, between items "138 & 140", delete "r" and insert therefor --r--.

At FIG. 4a, STEP 206, line 3, after the word "VECTOR", delete "r" and insert therefor --r--.

At FIG. 4b, STEP 236, line 2, after the word "VECTOR", delete "r" and insert therefor --r--.

At column 1, line 66, after the words "processed by", delete "resealing" and insert therefor --rescaling--.

At claim 4, column 9, line 46, after the word "includes", insert --:--.

Signed and Sealed this

Eighth Day of July, 2008

JON W. DUDAS
*Director of the United States Patent and Trademark Office*